Figure 1:
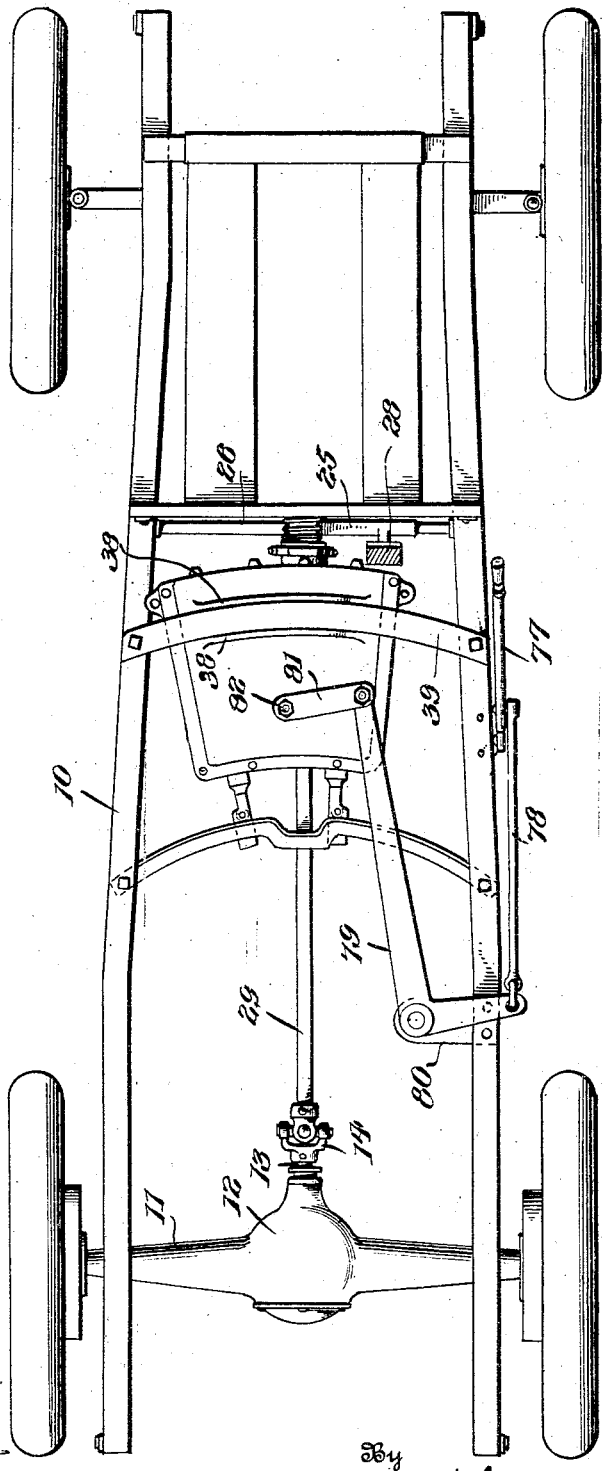

A. BAILEY.
GEARING.
APPLICATION FILED APR. 28, 1914.
1,136,392.
Patented Apr. 20, 1915.
2 SHEETS—SHEET 2.
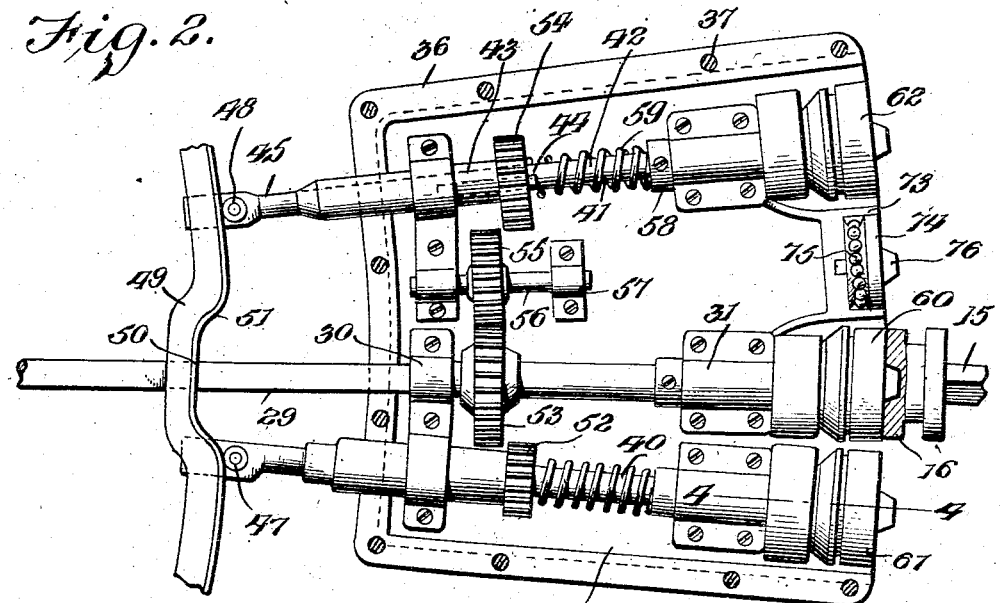
Fig. 2.
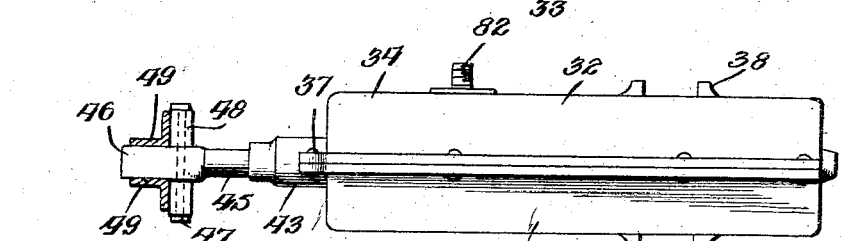
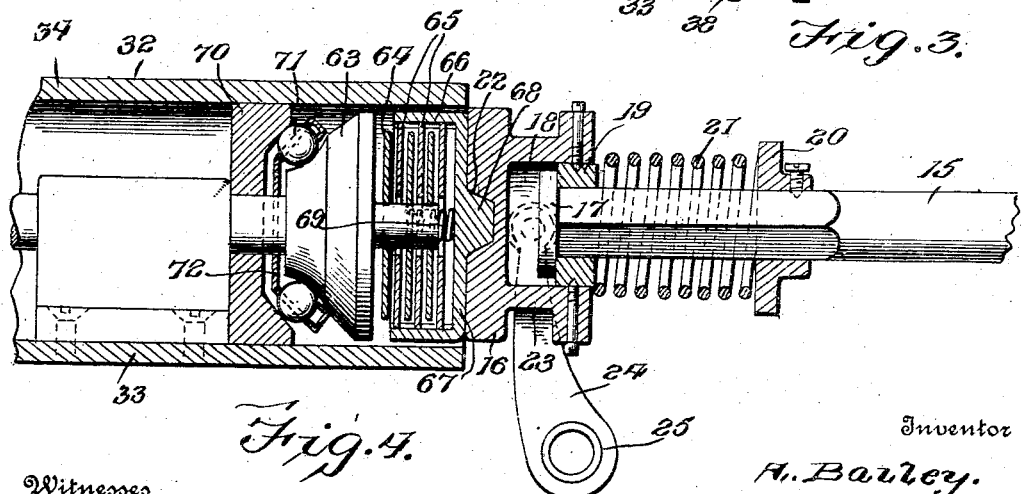
Fig. 3.
Fig. 4.
Witnesses
Inventor
A. Bailey.
By
Attorneys

UNITED STATES PATENT OFFICE.

AUBURN BAILEY, OF OAKLAND, CALIFORNIA.

GEARING.

1,136,392.  Specification of Letters Patent.  Patented Apr. 20, 1915.

Application filed April 28, 1914. Serial No. 834,998.

*To all whom it may concern:*

Be it known that I, AUBURN BAILEY, citizen of the United States, residing at Oakland, in the county of Alameda and State of California, have invented certain new and useful Improvements in Gearing, of which the following is a specification.

My invention relates to new and useful improvements in power transmission mechanisms, particularly to mechanisms of that type employed in transmitting power from the crank shaft of an engine to the rear axle in self-propelled vehicles, the primary object of my invention being the provision of a multiple clutch transmission mechanism.

In ordinary practice, sets of intermeshing gears are employed for transmitting the power, the speed ratio at which the power is transmitted being dependent upon the relative diameters of the meshing gears and the gears being selectively brought into mesh by means of a hand lever or other suitable mechanism, a clutch being also employed to interrupt the transmission of power during the shifting of the gears.

My present invention comprehends the provision of a transmission mechanism employing a drive shaft operatively connected to the differential mechanism of the vehicle at its rear end and to a clutch member at its forward end adapted to mate with the sliding clutch member of the crank shaft of the engine.

It further comprehends the provision of a plurality of jack shafts having gears movable into mesh with a gear carried by the drive shaft and each having a clutch member corresponding to the clutch member of the drive shaft, the drive shaft and jack shafts being so arranged and mounted that they may be swung as a whole from side to side to selectively bring the clutch member carried by any one of the shafts into alined engagement with the clutch member of the crank shaft.

A further object of my invention is to so arrange the gears upon the jack shafts that they will be automatically brought into mesh with the gear on the drive shaft as soon as the drive and jack shafts are swung to bring any one of the shafts into alinement with the clutch member on the crank shaft.

A yet further object of my invention consists in the provision of means for automatically moving the gears out of mesh upon swinging of the drive and jack shafts to other positions.

With these and other objects in view, my invention will be more fully described, illustrated in the accompanying drawings, and then specifically pointed out in the claims which are attached to and form a part of this application.

In the drawings:—Figure 1 is a top plan view of the running gear of a conventional motor vehicle showing my improved transmission system applied thereto; Fig. 2 is a top plan view of the clutch inclosing box with its cover plate removed, showing the manner of mounting the drive shaft, jack shafts and their clutch members; Fig. 3 is a side elevation of the structure shown in Fig. 2, the cover plate being in place; Fig. 4 is a fragmentary sectional view taken on the line 4—4 of Fig. 2.

Corresponding and like parts are referred to in the following description and indicated in all the views of the drawings by the same reference characters.

In order to insure a clear and complete understanding of my invention I have illustrated it in connection with a conventional form of motor vehicle including side frame members 10, a rear axle housing 11 having a differential gearing 12, the shaft 13 from which is connected to a universal joint 14 located immediately in advance of the differential housing. The crank shaft 15 from the engine is, of course, in direct longitudinal alinement with the shaft section 13 and at its rear end is squared to slidably receive the clutch member 16, the end of the shaft 15 being provided with a collar 17 fitting within a socket 18 in the forward face of the clutch member 16, which clutch member is held against disengagement from the shaft 15 by a collar 19 which engages with the collar 17. The shaft 15 carries a second collar 20 in spaced relation to the first and a strong helical spring 21 surrounding the shaft bears between the collar 20 of the shaft and the forward face of the clutch member 16.

The rear face of the clutch member 16 is provided with a tapered socket 22 having angularly disposed faces for locking engagement with a mating clutch member which will be later described. The clutch member 16 is further provided with a peripheral channel 23 to receive the forked arm 24 of the clutch operating lever which is preferably mounted upon a sleeve 25 journaled on a shaft 26 extending between the frame members 10 of the vehicle and operated by the usual foot pedal 28. By this arrangement, the clutch member 16 may be forced along the shaft 15 against the spring 21 but will normally be held by this spring with the collars 17 and 19 in engagement with each other.

The shaft section 13 is connected by the universal joint 14 with a drive shaft section 29, the forward portion of which is journaled in spaced, alined bearings 30 and 31 carried by the lower portion of a two-part housing, indicated as a whole by the numeral 32. This housing includes a lower portion 33 and an upper portion 34 and is substantially rectangular in shape, being provided along the side and rear edges of its sections with mating flanges 36 receiving clamp bolts 37 by means of which the sections are connected to form in effect a closed housing. Both the upper and lower sections are provided, in vertical alinement, with spaced arcuate guide ribs 38 which bear against the front and rear edges of arcuate supporting brackets 39 carried by the car frame. The radius of curvature of these brackets and ribs is equal to the distance between them and the center of the universal joint 14 and it will therefore be clear that the entire housing, together with the drive shaft 29, may be swung freely about such joint as a center.

The lower housing section 33 is provided adjacent each side with additional bearings corresponding to the bearings 30 and 31 and providing journals for jack shafts 40 and 41. Each of these jack shafts 40 and 41 includes two alined shaft sections 42 and 43, the former of which is journaled, in each case, in the bearing 31 of such shaft and the latter in the bearing 30. The shaft section 43, at its forward end, is provided with a squared socket to receive the squared rear terminal 44 of the corresponding shaft section 42 and at its rear end with a cylindrical socket to receive the cylindrical thrust pin 45. This thrust pin terminates at its rear end in a squared head 46 from which project upwardly and downwardly directed studs 47, each carrying a roller 48, the peripheral faces of the rollers being in vertical alinement with each other.

The squared heads 46 of the thrust pins of the jack shafts 40 and 41 seat between the horizontally disposed flanges of vertically spaced cam plates 49, each of these cam plates being L-shaped in cross section. The cam plates are disposed with their horizontal flanges adjacent each other and with their vertical flanges directed away from each other in such a manner that the rollers 48 bear against the vertical flanges when the heads of the thrust pins seat between the horizontal flanges. The cam plates are curved about the center of the universal joint 14 as a center and have their central portions rearwardly offset to provide a central bearing 50 and cam portions 51 at either end of such bearing. At this point it might be well to note that the bearings 30 and 31 of the jack shafts are so arranged in the housing that the jack shafts are radially disposed with respect to the universal joint 14.

Keyed upon the forward end of the shaft section 43 of the jack shaft 40, is a spur gear 52 adapted to mesh with a spur gear 53 keyed upon the drive shaft 29 when the said section of the jack shaft 40 is moved rearwardly. In like manner a spur gear 54, keyed upon the forward end of the section 43 of the jack shaft 41, is, under similar circumstances, adapted to mesh with a spur gear 55 keyed upon an idler shaft or countershaft 56 which is journaled in spaced bearings 57 carried by the housing, this gear 56, at all times, meshing with the gear 53 of the drive shaft 29. The drive shaft 29 and jack shafts 40 and 41 are each provided adjacent their bearings 31 with collars 58 and helical springs 59 surround the sections 42 of the jack shafts, bearing between these collars and the respective gears 52 and 54 of the jack shaft. It will therefore be clear that these springs tend, at all times, to force the sections 43 of the jack shafts rearwardly to bring their respective gears into mesh with the gears 53 and 55. Under certain conditions, however, such movement is prevented by the thrust pins 45 and their engagement with the cam plates 49. As soon, however, as the housing, with its shafts, is swung to one side or the other to bring either of the jack shafts into longitudinal alinement with the shaft section 13, it will be clear that the rollers 48 of such jack shaft's thrust pin riding into the rearwardly offset portion 50 of the cam plates, permits rearward movement of the section 43 of such jack shaft to bring its gear into mesh with the gear 53 of the drive shaft or the gear 55 of the countershaft, as the case may be. Again, reverse movement will cause the rollers of the trust pin of such jack shaft to ride over one or the other of the cam faces 51 of the cam plates to again force the gears out of mesh.

The drive shaft 29 and jack shafts 40 and 41 carry clutch members 60, 61 and 62, respectively, each of which is adapted, under certain circumstances, to co-act with the clutch member 16 carried by the crank shaft 15. As these clutch members are identical in construction, a description of one will suffice for both. Referring more specifically to Fig. 4 of the drawings, it will be seen that each of these clutch members includes a body portion 63 having a conical rear face, the shaft in each case passing through this body portion and carrying a plurality of clutch disks 64. Co-acting clutch disks 65, disposed between adjacent disks 64, are carried by the annular flange 66 of a clutch portion 67 which is provided centrally of its forward face with a tapered stud 68 having angular faces, this stud being adapted for engagement in the tapered socket 22 of the clutch member 16. It will of course be seen that the seating of these tapered studs in the tapered sockets will serve to properly centralize the clutch members when any one of the shafts is brought into alinement with the crank shaft 15 and the clutch released to force the disk 64 into engagement with the disk 65.

The forward end of the shaft carrying the above described clutch members, is recessed to receive a relatively light helical spring 69 which tends to normally maintain the disks in spaced relation except when the clutch members are in locking engagement with each other. As the above described clutch members are largely conventional in construction, being of the multiple disk type, any further description of them is believed to be unnecessary.

Surrounding each of the shafts 29, 40 and 41, immediately in advance of their bearings 31, are thrust blocks 70 which, in connection with the portions 63 of the adjacent clutch members, form bearing surfaces for a plurality of ball bearings 71 carried by a ball race or cage 72, this construction taking up the thrust of the clutch during operation.

It should be noted that the jack shaft 41 is spaced a considerable distance from the drive shaft 29 and that the housing sections, between the clutch members of such shafts, are provided with walls 73 forming, when the sections are secured together, a supplemental housing for a thrust member 74 having a ball race 75, this member being mounted for rotation about a stud carried by the walls and having a central stud 76 corresponding to the stud 68 of the clutch members 60, 61 and 62. This thrust member, with its stud, in effect, corresponds to the clutch members and provides a neutral position for the transmission gearing as will be later explained.

Any suitable mechanism may be provided for swinging the transmission gearing housing 32 from side to side to bring the various clutch members of its shafts into alinement with the clutch member 16 of the crank shaft of the engine. One such means is shown in Fig. 1 in which a hand lever 77 is swingingly mounted at the side of the car frame and connected by a link 78 to one arm of a bell crank lever 79, said lever being pivoted upon a bracket 80 and connected by its other arm to a link 81, the free end of which is pivotally joined to a stud 82 projecting from the top of the upper housing section 34. It will of course be clear that swinging of this hand lever forwardly or rearwardly will cause a movement of the housing 32 to one side or the other as the case may be.

Having thus described the construction of my improved multiple clutch transmission gearing, I will now explain its operation, particular reference being had to Figs. 1 and 2 of the drawings. For the sake of convenience in this explanation I will assume that the clutch member 16, carried by the crank shaft 15 of the engine, is in locking engagement with the stud 76 of the thrust member 74, this being the neutral position of the parts. In this position, it will be clear that the engine may be started in the usual manner without in any way transmitting any power to the rear axle as the rotation of the crank shaft 15 will merely result in rotating the idly mounted thrust member 74. When the vehicle proper is to be started, the foot pedal 28 is depressed to free the clutch member 16 from the thrust member 74 and the hand lever 77 manipulated to swing the housing 32 toward the right of the car until the jack shaft 42 is brought into alinement with the crank shaft 15. Such swinging movement seats the rollers 48 of the thrust pin of the jack shaft 42 in the rearwardly offset portion of the cam plates and consequently permits the spring 59 of such jack shaft to force the gear 54 into mesh with the gear 55 of the counter-shaft 56. It will be clear that, assuming the car is at rest, neither of the gears 54 and 55 will be moving and there is, therefore, no possibility of injury to the gears during this meshing operation. Even, however, if the vehicle is moving, although the gear 55 will be rotating, there will be absolutely no load on the gear 54 and no injury can therefore result. When the jack shaft 42 has thus been brought into alinement with the crank shaft 15, the clutch pedal is released to permit the clutch member 16 to move into locking engagement with the clutch member 62 of the jack shaft to force the clutch disks 64 and 65 into engagement with each other, power then being transmitted from the crank shaft through the jack shaft 42 and counter-shaft 56 to the drive shaft 29 and so to the rear axle. After sufficient headway has been attained, the clutch member 16 is released from the clutch member 62 and the housing 32, with its shafts, swung in the reverse direction to bring the drive shaft 29 into alinement with the crank shaft 15 and the clutch members 16 and 60 interlocked. This last mentioned swinging of the housing causes the rollers of the jack shaft 42 to ride over the cam faces 51 of the cam plates and so free the gear 54 from the gear 55 before the shafts 15 and 29 become locked.

In order to reverse the direction of movement of the car, the casing 32, with its shafts, is swung to bring the clutch member 61 into engagement with the clutch member 16 when the drive takes place through the gears 52 and 53. The gears may, of course, be placed in neutral at any time by bringing the clutch member 16 into engagement with the thrust member 74.

From the foregoing description, it will be apparent that no gears are moved into or out of mesh when both are under load and that all stripping of gears is therefore avoided. Furthermore, as the transmission is through clutches of the multiple disk type, the provision of a plurality of intermediate speeds, such as are necessary in present day gear transmission mechanisms, is unnecessary.

It will of course be understood that I do not wish to limit myself to the specific details of construction, illustrated and described, as various changes may be made at any time without in the slightest degree departing from the spirit of my invention, as set forth in the claims.

Having thus described the invention, what is claimed as new is:

1. In a power transmission mechanism, the combination with a driven clutch member, of a driving shaft, a coacting clutch member thereon, a plurality of jack shafts, clutch members thereon adapted to co-act with the driven clutch member, means for swinging the jack shafts to selectively bring their clutch members into engagement with the driven clutch member, and means for transmitting power from the jack shafts to the driving shaft.

2. In a power transmission mechanism, the combination with a driven clutch member and a driving shaft including a universal joint, of a co-acting clutch member carried by the driving shaft, a plurality of jack shafts, co-acting clutch members carried by the jack shafts for engagement with the driven clutch member, means for simultaneously swinging the driving shaft and jack shafts to selectively bring their clutch members into engagement with the driven clutch member, and means for transmitting power from the jack shafts to the driving shaft.

3. In a power transmission mechanism, the combination with a driven clutch member and a driving shaft including a universal joint, of a co-acting clutch member carried by the driving shaft, a plurality of jack shafts, co-acting clutch members carried by the jack shafts for engagement with the driven clutch member, means for simultaneously swinging the driving shaft and jack shafts to selectively bring their clutch members into engagement with the driven clutch member, and means for transmitting power from each of the jack shafts to the driving shaft, said means becoming operative only when the clutch member of the jack shaft is in engagement with the driven clutch member.

4. In a power transmission mechanism, the combination with a driven clutch member and a swingingly mounted driving shaft having a clutch member adapted to co-act with the driven clutch member but movable away from the same through swinging of the shaft, a plurality of jack shafts having clutch members also movable into and out of engagement with the driven clutch member, each jack shaft including telescopic portions, a gear carried by the driving shaft, a gear upon one portion of the jack shaft adapted upon longitudinal movement of such portion to move into operative relation with respect to the gear carried by the driving shaft, and means for imparting longitudinal movement to said jack shaft sections when the jack shafts are brought into alinement with the shaft of the movable clutch member.

5. In a power transmission mechanism, the combination with a driven clutch member carried by a crank shaft and a driven shaft carrying a universal joint, of a driving shaft connected at one end to the universal joint a clutch member at the other end of the driving shaft adapted for engagement with the driven clutch member, a support for the driving shaft mounted for swinging movement about the universal joint as a center, a plurality of jack shafts also carried by the support and extending radially with respect to the universal joint, clutch members carried by said jack shafts, and means for transmitting power from the jack shafts to the driving shaft.

6. In a power transmission mechanism, the combination with a driven clutch member carried by a crank shaft and a driven shaft carrying a universal joint, of a driving shaft connected at one end to the universal joint, a clutch member at the other end of the driving shaft adapted for engagement with the driven clutch member, a support for the driving shaft mounted for swinging movement about the universal joint as a center, a plurality of jack shafts also carried by the support and extending radially with respect to the universal joint, clutch members carried by said jack shafts, and means for transmitting power from the jack shafts to the driving shaft, said means including a gear carried by the driving shaft and gears carried by the jack shafts and movable into operative relation with the gear of the driving shaft upon movement of the jack shafts into alinement with the driven clutch member.

7. In a transmission gearing, the combination with a reciprocally mounted driven clutch member and a driving shaft of spaced upper and lower guides curved longitudinally about the universal joint as a center, a housing mounted for sliding movement between the guides and having bearings for the driving shaft, a clutch member carried by the driving shaft for engagement with the driven clutch member when the driving shaft is swung into alinement with the shaft of said clutch member, a gear on the driving shaft, a countershaft, an idler gear on the countershaft meshing with the gear of the driving shaft, jack shafts journaled in the housing and clutch members thereon for engagement with the driven clutch member, a gear on one of said jack shafts movable into mesh with the gear of the driving shaft and a gear on the other jack shaft movable into mesh with the idler gear.

8. In a transmission gearing, the combination with a reciprocally mounted driven clutch member and a driving shaft, of spaced upper and lower guides curved longitudinally about the universal joint as a center, a housing mounted for sliding movement between the guides and having bearings for the driving shaft, a clutch member carried by the driving shaft for engagement with the driven clutch member when the driving shaft is swung into alinement with the shaft of said clutch member, a gear on the driving shaft, a countershaft, an idler gear on said countershaft meshing with the gear of the driving shaft, jack shafts journaled in the housing, clutch members thereon for engagement with the driven clutch member, a gear on one of said jack shafts movable into mesh with the gear of the driving shaft and a gear on the other jack shaft movable into mesh with the idler gear, said gears being mounted upon telescopic jack shaft sections, a cam member, thrust pins carried by such sections and engaging against the cam member permitting rearward movement of the sections when the shafts are in alinement with the driven clutch member, and springs normally tending to hold the gear carried sections in rearward position.

9. In a power transmission mechanism, the combination with a driven clutch member and a driven shaft, of a driving shaft, a clutch member upon one end of the driving shaft, an idler clutch member, and means for simultaneously swinging the driving shaft, clutch member, and idler clutch member to bring either of them into engagement with the driven clutch member.

10. In a power transmission mechanism, the combination with a driven clutch member, of a driving shaft, a clutch member carried by the driving shaft, a jack shaft, a clutch member carried by the jack shaft, power transmitting means between the shafts, means for simultaneously swinging the shafts to bring either of their clutch members into engagement with the driven clutch member, and means operable by swinging of the shafts for bringing the power transmitting means between the shafts into and out of active position, depending upon whether the clutch member of the jack shaft or the clutch member of the driving shaft is moved into engagement with the driven clutch member.

11. A power transmission mechanism including a driven clutch member, a driving shaft, a clutch member upon the driving shaft, a jack shaft, a clutch member upon the jack shaft, an idler clutch member mounted for free turning movement, means for swinging the shafts and idler clutch member to bring the driven clutch member into engagement with either of the other clutch members, and means for transmitting power from the jack shaft to the driving shaft when the clutch member of the jack shaft engages the driven clutch member, said means being inoperative at all other times.

12. A power transmission mechanism including a driven shaft, a driven clutch member thereon, a driving shaft, a clutch member upon the driving shaft, a jack shaft, a clutch member upon the jack shaft, an idler clutch member mounted for free turning movement, means for swinging the shafts and idler clutch member to bring the driven clutch member into engagement with either of the other clutch members, and means for transmitting power from the jack shaft to the driving shaft when the clutch member of the jack shaft engages the driven clutch member, said means being inoperative at all other times, and including a gear on the driving shaft, a gear reciprocally mounted on the driven shaft and normally held out of mesh with the first gear, and a cam member for swinging such gear into mesh with the first gear.

13. A power transmission mechanism including a driven shaft, a driven clutch member thereon, a driving shaft, a clutch member upon the driving shaft, a jack shaft, a clutch member upon the jack shaft, an idler clutch member mounted for free turning movement, means for swinging the shafts and idler clutch member to bring the driven clutch member into engagement with either of the other clutch members, and means for transmitting power from the jack shaft to the driving shaft when the clutch member of the jack shaft engages the driven clutch member, said means being inoperative at all other times, and including a gear on the driving shaft, a gear reciprocally mounted on the driven shaft and normally held out of mesh with the first gear, and a cam member for swinging such gear into mesh with the first gear, the cam member being disposed in the path of movement of the jack shaft and engaged by such shaft.

In testimony whereof I affix my signature in presence of two witnesses.

AUBURN BAILEY. [L. s]

Witnesses:
H. M. FURMAN,
E. S. PERRY.

Copies of this patent may be obtained for five cents each, by addressing the "Commissioner of Patents, Washington, D. C."